Figure 1:
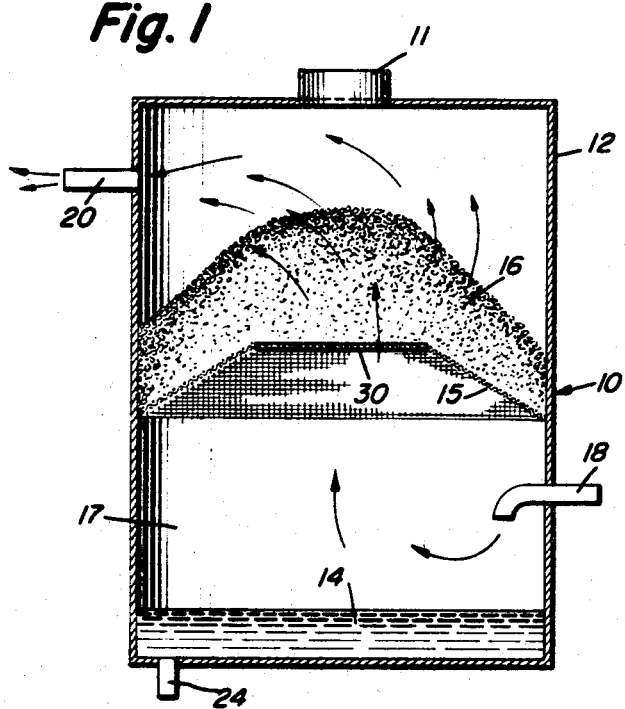

July 2, 1968

O. C. NORTON 3,390,511

GAS DRYER DESICCANT AND METHOD OF PREPARATION

Filed Nov. 9, 1965

INVENTOR
Orlo C. Norton

BY *Walter G. Finch*
ATTORNEY

3,390,511
GAS DRYER DESICCANT AND METHOD OF PREPARATION

Orlo C. Norton, Erie, Pa., assignor to Van Products Company, Erie, Pa., a corporation of Pennsylvania
Continuation-in-part of application Ser. No. 434,167, Feb. 8, 1965. This application Nov. 9, 1965, Ser. No. 507,084
8 Claims. (Cl. 55—35)

This application is a continuation in part of pending United States patent application Ser. No. 434,167, filed by applicant on Feb. 8, 1965, now abandoned for Gas Drier Desiccant and Method of Preparation, which patent application in turn is a continuation in part of United States patent application Ser. No. 364,115 filed by applicant on May 1, 1964, for Gas Drier Desiccant and Apparatus Therefor, now abandoned, which patent application in turn was a continuation in part of United States patent application Ser. No. 268,608 filed by applicant on Mar. 28, 1963, for Gas Dryer, now abandoned, with said latter patent application being a continuation in part of United States patent application Ser. No. 96,974 filed by applicant on Mar. 20, 1961, now abandoned, with said United States patent application Ser. No. 96,974 being a continuation in part of United States patent application Ser. No. 678,227 filed by applicant on Aug. 14, 1957, for Gas Dryer, now abandoned.

This invention relates to a desiccant and process for removing moisture from gases and especially air. The desiccant is a porous, granular solid which dissolves when contacted with moist air, and is utilized in the form of an air permeable bed positioned in the path of the moist air by a screen support or the like. In use, the desiccant bed dissolves and the resulting liquid is collected in a sump beneath the screen support.

The present invention contemplates the use of a desiccant for removing moisture from gases with the desiccant comprising a water soluble, substantially non-deliquescent porous carrier in pellet-like form, impregnated with a deliquescent material. An example of the carrier or pellet material is sodium chloride and of the impregnating deliquescent material calcium chloride. Moist air passing through a bed of such impregnated pellets is attracted by the deliquescent material (e.g. the calcium chloride) which after sufficient contact with the moisture becomes liquid. This liquid in turn dissolves the water soluble carrier material and the resulting solution flows from the desiccant bed, leaving it efficacious to further moisture removal.

The impregnating material used has a much greater affinity for water than the carrier material. The fact that this impregnating material is deliquescent means that it liquefies upon exposure to sufficient moisture before any of the carrier material goes into solution. Thus, the porous, granular water soluble carrier pellet remains almost entirely intact in its original form until dissolved by the liquid created within its pores and on its surface by the liquefication of the impregnating material. The present invention provides the first recognition of the result obtainable by matching a deliquescent impregnate material with a water soluble, porous, non-deliquescent granular material, and is the first to obtain this result of complete dissolution of a solid desiccant upon its continued exposure to moisture. In terms of drying practice, the present invention provides the first solid desiccant material that alleviates the problem associated with prior art solid desiccants of removing desiccant residues from a drying apparatus.

The desiccant material of this invention can be varied from neutral pH to acid or alkaline, but if the air drying apparatus coming into contact with the material or its solution is of a nature susceptible to corrosion, the desiccant material should preferably be maintained slightly alkaline. The desiccant material may be disposed in an apparatus connected to a compressed air system and also to an after cooler, if lower dew points are desired. Containers utilizing this improved material can be also used to remove moisture from tank vents to prevent the entrance of atmospheric and entrained moisture when the tank breathes, is emptied or filled. Oil, alcohol and gasoline storage tanks are examples of these applications.

An example of suitable drying apparatus in which the desiccant of the present invention can be used is the apparatus shown in United States Patent No. 2,642,951, issued June 23, 1953, to the present inventor, in which this desiccant can be employed as a bed of pellets constituting bed (24) therein. In such apparatus, air enters the drier tank from the compressor and preferably at a tangent or through a curved inlet at high velocity, and because of the entrance in this manner, the air swirls in a circular fashion thereby throwing formed drops of oil, water or other articles suspended in the air outwardly or downwardly against the tank wall. These drops of liquid then gravitate to a sump at the bottom of the tank which can be drained as necessary. The swirled air then moves upwardly to and through the desiccant bed and through an outlet in the tank. During passage of the moist air through the desiccant pellets, the impregnant absorbs the moisture and deliquensces, and because of the intimate contact of this first formed liquid with the surface and pores of the carrier material, the carrier also begins to dissolve. As this dissolution continues, the resultant solution drips from the bottom of the screen or mesh-like support and down to the swirling air to collect in the bottom of the tank.

As the air progressively passes through the desiccant bed, the amount of moisture in this air becomes less and less. Thus only slight moisture reaches the pellets at and near the upper surface of the desiccant bed, and deliquescence does not occur initially in this upper area until after some use. Meanwhile, the pellets in the lower portion of the bed are dissolving away into solution which drops down into the sump. Additional fresh desiccant can be added to the top of the bed as may be required.

At an inlet air temperature of approximately 65° to 70° F., a dew point of from 10 to 0 degrees F. can be obtained by using calcium chloride as the impregnant and sodium chloride pellets (e.g. water softener pellets) formed from the conventional cube-like crystals of sodium chloride, as the carrier. Lower dew points can be achieved by lowering the ambient temperature or with an after cooler connected between the compressor and the drying apparatus.

An example of the improved desiccant which has been successfully used for general air drying purposes is by weight as follows:

|  | Percent |
|---|---|
| Sodium chloride NaCl (water softener pellets) | 90–97 |
| Calcium chloride $CaCl_2$ | 10–3 |
| Sodium dichromate | .01 |
| Trisodium phosphate | .01 |

A specific example of the use of the above formulation is:

| | | |
|---|---|---|
| Sodium chloride pellets | pounds | 100 |
| Calcium chloride | do | 5 |
| Sodium dichromate | ounces | 1 |
| Trisodium phosphate | do | 1 |

In the above example, sodium chloride acts as the porous, granular, water soluble carrier in pellet form. Calcium chloride acts as the hygroscopic, deliquescent, impregnating material. Sodium dichromate acts to prevent rust of the metal parts (if any) of the drying apparatus, and also adds a pleasing color to the product. Trisodium phosphate is adapted to emulsify any oil which may be entrained in the air stream.

If more than approximately 10% of the hydroscopic deliquescent impregnant, such as the calcium chloride, is used, the mass of pellets would temporarily solidify due to excessive deliquescence, and drying action will be not of peak efficiency until the excess impregnant drips away and the bed again becomes easily permeable by air. If less than approximately 1% of impregnant is used, the amount of deliquescence would be generally inadequate to dissolve the water soluble carrier material at the proper rate of dissolution, to aid in removing moisture from the air or gas being dried. In short, the amount of deliquescent material that is absorbed or impregnated into and onto the water soluble, porous, granular carrier is that amount which provides for adequate dissolution of the resultant desiccant.

Other suitable carrier materials which may be utilized within the above mentioned range of 90% to 97% by weight, and which will act effectively for use in providing the desiccant of the invention are as follows:

Sugar:
    Sucrose _____ $C_{12}H_{22}O_{11}$
    Glucose _____ $C_6H_{12}O_6$
    Fructose _____ $C_6H_{12}O_6$
    Lactose _____ $C_{12}H_{22}O_{11} \cdot H_2O$
    Maltose _____ $C_{12}H_{22}O_{11} \cdot H_2O$
Potassium Chloride _____ $KCl$
Potassium nitrate _____ $KNO_3$
Sodium nitrate _____ $NaNO_3$
Starch _____ $(C_6H_{10}O_5)_x$ Other deliquescent impregnating materials which would be suitable for producing the deliquescent desiccant of the invention are as follows and as used within the above mentioned range of 10% to 3%:

Zinc chloride _____ $ZnCl_2$
Lithium chloride _____ $LiCl$

The improved desiccant of this invention may be prepared as follows:

The carrier pellets may be of any desirable size, and preferably are of a size of pellet of 1/64 inch to 1 inch in any minimum dimension, with the most desirable dimensions being between 1/2 inch and 1 inch. Such carrier pellets may be immersed in a saturated solution of the deliquescent impregnating material, or the liquid impregnating material can be poured over the pellets. It is immaterial which procedure is followed because of the porosity of the carrier material. Impregnation can be done at room temperature but a more concentrated impregnation can be achieved if the materials are heated.

In a specific process, sodium chloride pellets are heated to 400° to 600° F. The impregnant, such as calcium chloride and/or zinc chloride, and the sodium dichromate and trisodium phosphate, all in water, are also heated to the boiling point of the resulting solution. The pellets may then be immersed in this hot, saturated solution, and then removed therefrom, and then placed in a tumbler and tumbled while cooling, to maintain separation of the pellets. The resultant product is a hard, dry, impregnated and coated lump or pellet. Inorganic materials such as the alkali metal chlorides are preferred as carrier materials if heated impregnation is used, as they are more stable at higher temperatures than organic materials such as the sugar and starch.

In a specific process using Sucrose pellets or tablets as the carrier and lithium chloride as the impregnant, a water solution of the lithium chloride is heated to a temperature of approximately 250° F. and then the hot saturated solution is poured over the sugar pellets which are at room temperature. The impregnated pellets may then be placed in an oven pre-heated to 230° F., and left there for a period of time (e.g., 45 minutes) after which they are removed from the oven and cooled, as by means of a chilling device.

Referring now more specifically to the drawing, FIG. 1 shows a dehydrator 10 comprising a tank 12 having a fill vent 11 with a suitable cover for replenishing the desiccant pellets 16. The liquid level of water removed from the air is shown at 14. This water may be drained off as at 24 at suitable intervals. An apertured partition 30 divides the tank into a sump 17 and the upper portion receiving the pellets 16. The partition 30 may include on its sides porous portions 15 which may be of coarse, screen mesh. The pellets 16 rest on top of the partition 30.

An inlet opening 18 in the dehydrator tank 12 allows the air to pass into the dehydrator. The dehydrator could be used in an air line by connecting an air inlet to the air inlet opening 18 and an outlet line to the vent 20, which will allow air to flow into the tank through the opening 18 and up through the bed of pellets 16 to the outlet opening 20 in a generally uniform pattern.

The partition 30 in the embodiment illustrated is formed in the general shape of the frustrum of a cone, having the outer periphery of the base thereof attached to the inner periphery of the tank 12. The chemical desiccant forming the bed of desiccant may take a generally natural shape when poured into the tank, such as that shown in FIG. 1, which is roughly that of a cone as the desiccant material is added through the supply opening 11.

Figure 2:
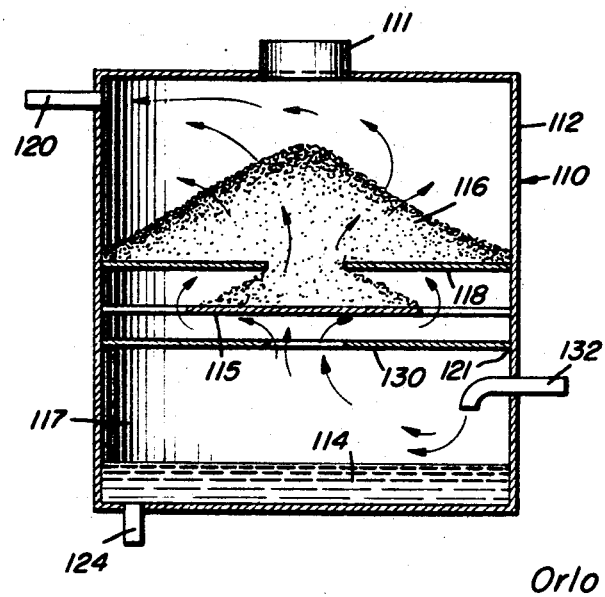

In the embodiment illustrated in FIG. 2, the dehydrator 110 has a tank 112 which is shown with an inlet 132 and an outlet 120. The inlet 132 is curved so that the air will take a downward swirling action and therefore tend to throw out entrained water similar to the arrangement of FIG. 1. Baffle 130 is a solid baffle with a generally central opening, and having the outer periphery of the baffle attached to the inside of the tank 112, as at 121. A baffle 115 is a solid baffle having a solid center portion and being attached to the outer periphery of the tank 110 at spaced points, so that the air can pass around the baffle 115 as indicated by the arrows. A baffle 118 is generally similar to the baffle 130 having a central opening therethrough.

Therefore, when the impregnated desiccant pellets are added to the tank through supply opening 111 and settle on top of the baffle 118, they may take the general shape of a cone, as shown, and a part thereof will fall through the central opening of the baffle 118 and rest on top of the central part of the baffle 115 as shown, and the air or gas will pass through the bed 116 generally uniform as indicated by the arrows. Accordingly, the desiccant bed will absorb moisture from the air and the absorbed moisture will go into solution as aforedescribed and fall down and accumulate in sump 117, as at 114. The drain 124 may be provided generally similar to that of drain 24 of the FIG. 1 embodiment.

Obviously, many modifications and variations of the present invention are possible in the light of the above teachings. It is therefore, to be understood that within the scope of the appended claims the invention may be practiced otherwise than as specifically described.

I claim:

1. A desiccant material for drying gas consisting essentially of a porous, water-soluble granular carrier in pellet-like form of sodium chloride impregnated substantially only on the surface portions thereof with calcium chloride, said sodium chloride being present in an amount of approximately 90% to 97% of the total weight of the desiccant material and said calcium chloride being present in an amount of approximately 10% to 3% of the total weight of the desiccant material, said calcium chloride upon exposure of the desiccant material to a gas containing moisture being operative to absorb the moisture in the gas and to dissolve into liquid resulting in dissolving of the water-soluble carrier.

2. A desiccant material in accordance with claim 1 wherein said desiccant material contains a minor quantity of a material having rust inhibiting properties, in the order of approximately 0.01% of the total weight of the desiccant material.

3. A desiccant material in accordance with claim 2 wherein said material having rust-inhibiting properties consists essentially of sodium dichromate.

4. A desiccant material in accordance with claim 1 wherein said desiccant material contains a minor quantity of a material which is operative to emulsify oil in the gas, said oil emulsifying material being in the order of approximately 0.01% of the total weight of the desiccant material.

5. A desiccant material in accordance with claim 4 wherein said material which is operative to emulsify oil consists essentially of trisodium phosphate.

6. A method of dehydrating a gas containing moisture comprising passing said gas through a permeable bed consisting essentially of porous, water-soluble, pellets of sodium chloride, providing a carrier impregnated substantially only on the surface portions thereof with a deliquescent material, said sodium chloride being present in in an amount of approximately 90% to 97% of the total weight of the impregnated carrier, said deliquescent material consisting essentially of calcium chloride, in an amount of approxmiately 10% to 3% of the total weight of the impregnated carrier, said deliquescent material being operative to dissolve into liquid upon exposure of the impregnated pellets to the gas-containing moisture due to the absorbing of the moisture from the gas, and resulting in dissolving of the carrier.

7. A process for preparing a desiccant material for use in drying gas comprising, providing a porous, granular, generally water-soluble carrier of sodium chloride, heating said carrier to a temperature of between approximately 400° F. to 600° F., heating a solution of deliquescent calcium chloride material to form a hot saturated solution, and then exposing said heated carrier to said hot saturated solution of deliquescent material to impregnate substantially only the surface portions of said carrier with said deliquescent material, said sodium chloride being present in an amount of approximately 90% to 97% of the total weight of the desiccant material and said calcium chloride being present in an amount of approximately 10% to 3% of the total weight of the desiccant material, and then drying said impregnated carrier by tumbling the impregnated carrier while the latter cools.

8. A process in accordance with claim 7 wherein said solution of deliquescent material is poured over said carrier material to expose said carrier material to said solution of deliquescent material.

References Cited

UNITED STATES PATENTS

| | | | |
|---|---|---|---|
| 1,041,608 | 10/1912 | Edeleanu | 252—194 |
| 2,203,144 | 6/1940 | Hammond | 252—194 |
| 2,951,812 | 9/1960 | Rapp | 252—194 |
| 2,967,154 | 1/1961 | Beerman | 252—194 |
| 2,988,509 | 6/1961 | Schilberg | 55—35 |

OTHER REFERENCES

Gregory, T. C.: "Uses and Application of Chemical and Related Materials," Reinhold Publishing Co., 1939, pp. 624 and 625.

REUBEN FRIEDMAN, *Primary Examiner.*

SAMIH N. ZAHARNA, *Examiner.*

C. N. HART, *Assistant Examiner.*